307 / 425 XR 3,761,154

United States Patent [19]

Shupe et al.

[11] 3,761,154

[45] Sept. 25, 1973

[54] DISPLAY DEVICE GENERATING MANY SUPERIMPOSED OUTPUT SIGNALS TO PROVIDE AN IMAGE

[75] Inventors: David M. Shupe, Troy; Takeo Sawatari, Birmingham, both of Mich.

[73] Assignee: The Bendix Corporation, Southfield, Mich.

[22] Filed: Dec. 27, 1971

[21] Appl. No.: 212,460

[52] U.S. Cl. .................................. 350/3.5, 307/88.3
[51] Int. Cl. .......................................... G02b 27/00
[58] Field of Search ..................... 350/3.5; 307/88.3; 330/8

[56] References Cited

UNITED STATES PATENTS

| | | | |
|---|---|---|---|
| 3,542,452 | 11/1970 | Gerritsen et al. | 350/3.5 |
| 3,547,509 | 12/1970 | Brandes | 350/3.5 |

*Primary Examiner*—David Schonberg
*Assistant Examiner*—Ronald J. Stern
*Attorney*—John S. Bell et al.

[57] ABSTRACT

An image is formed by generating a large number of simple interference patterns and sequentially projecting those interference patterns onto an organic dye cell amplifier. The amplifier absorbs energy from the interference patterns and uses the absorbed energy to modulate a beam of laser light to provide a sequence of output signals. No one output signal comprises a complete image, and a large number of output signals must be integrated or superimposed in order to form an image. However, the output signals are generated at such a fast rate that an observer's eyes will integrate those signals so that the observer perceives them as a complete image. The observer's eyes integrate successive output images to perceive a changing scene.

8 Claims, 1 Drawing Figure

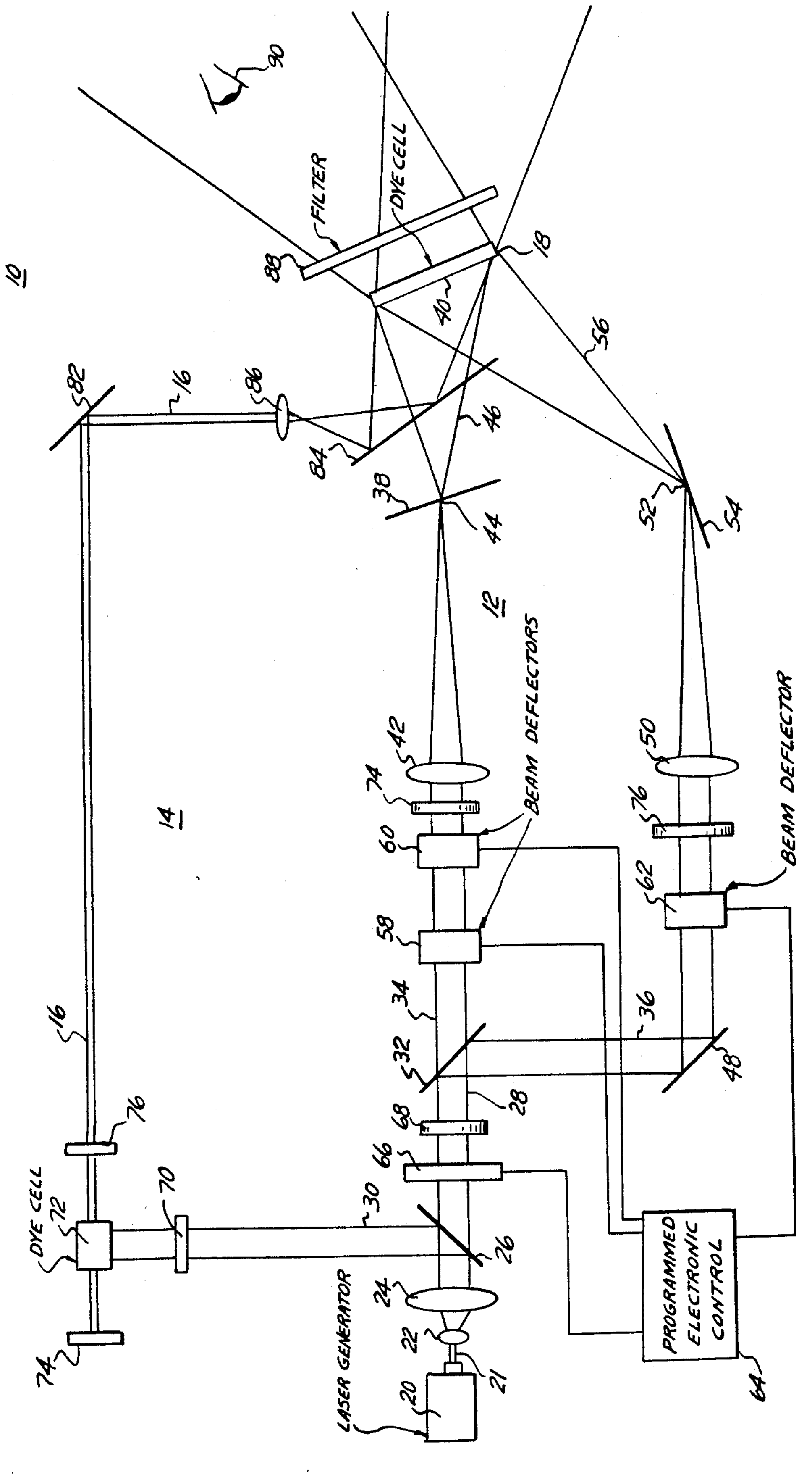
FILTER
DYE CELL
BEAM DEFLECTORS
BEAM DEFLECTOR
DYE CELL
LASER GENERATOR
PROGRAMMED ELECTRONIC CONTROL

DISPLAY DEVICE GENERATING MANY SUPERIMPOSED OUTPUT SIGNALS TO PROVIDE AN IMAGE

BACKGROUND OF THE INVENTION

1. Field of the Invention

Holography.

2. Brief Description of the Prior Art

Apparatus for synthetically creating a hologram and for using that hologram to provide a three-dimensional image for an observer is described in Application Ser. No. 116,983, now U.S. Pat. No. 3,698,787 assigned to The Bendix Corporation. A hologram is synthesized by directing coherent wave energy from two point sources to interfere proximate a recording medium. The interference pattern produced depends on the relative positions of the two point sources. Both sources are moved according to a predetermined program to a number of different positions to produce different interference patterns. The various interference patterns produced are superimposed on the recording medium in order to form a complex interference pattern or hologram. A three-dimensional output image is provided by directing a beam of coherent laser light to strike and be modulated by the hologram. A series of holograms can be generated to produce different images that an observer perceives as a substantially real time view of a changing scene.

The above-described synthesizing apparatus must generate and record interference patterns at a very fast rate in order to provide output images for an observer. Between 1,000 and 10,000 simple interference patterns must be generated and superimposed on each other in order to form a typical hologram capable of providing an output image. It is necessary to generate successive holograms and provide successive output images within the integration time of an observer's eyes, which is only approximately 1/30th of a second, in order to provide an output that an observer perceives as a real time view of a changing scene. Conventional recording media such as photographic film, photochromic material and thermoplastic material record received signals at a slightly slower rate than is desirable to provide a true real time output. The recording or integration time of these media limits the rate at which the holographic synthesizing device is capable of operating. It is an object of this invention to provide a true, real time output display by providing three-dimensional output images at faster rates than those images can be provided by the prior art holographic synthesizing devices using conventional recording media.

In addition, holographic synthesizing devices employing conventional recording media require other apparatus operating in cooperation with the conventional recording media that increases the complexity of the overall synthesizing device. For example, photographic film is not an erasable media. It is, therefore, necessary to form subsequent holograms on successive frames of a strip of film. Mechanical apparatus is required to move successive frames of the film strip passed apparatus for synthetically creating a hologram and subsequently passed apparatus for illuminating the holograms to provide output images. A holographic synthesizing device utilizing photochromic recording media must project high intensity interference signals onto that media in order to record a hologram. In addition, apparatus for generating a separate laser signal is required to rapidly bleach or erase a hologram recorded on photochromic media. A synthesizing device employing thermoplastic recording media must include apparatus for heating the thermoplastic media to the melting point of that media when a hologram is being either developed or erased. It is an object of this invention to provide a device for synthetically creating three-dimensional images that is less complicated than synthesizing devices utilizing conventional recording media.

SUMMARY OF THE INVENTION

The device of this invention provides a three-dimensional output image by generating a sequence of simple interference signals. These interference signals are alternatively referred to herein as interference patterns. The super position of the simple interference patterns comprises a complete hologram. The simple interference patterns are sequentially mixed with a predetermined wave energy signal to provide a sequence of output signals. The super position of the output signals form a complete image. These output signals are generated at such a fast rate than an observer's eyes integrate the output signals so that the observer perceives a complete image. Subsequent images are generated to provide a sequence of different images which an observer perceives as a real time view of a changing scene.

In the embodiment illustrated herein, the simple interference signals are sequentially projected onto an organic dye material. The organic dye material absorbs energy from the interference signals to thereby record those signals, and utilizes the absorbed energy to modulate a beam of coherent laser light. As stated previously, a very large number of simple interference patterns, generally between 1,000 and 10,000 patterns are required to form a holographic signal pattern. However, the integration time of the organic dye is so short that no more than a few of the very many interference patterns required to form a hologram of the complete image are recorded and used by the organic dye to modulate the laser beam at any one instant. As used herein, the "integration time" of a recording media comprises that time interval during which the media is capable of receiving and combining subsequent signals to thereby record a composite signal. The integration time of a self-erasing recording media such as an organic dye material comprises the time interval during which the dye material retains absorbed energy and is capable of utilizing that absorbed energy to modulate a beam of laser light.

Since the integration time of the dye material is very short, that material provides a sequence of output signals with subsequent output signals being provided in subsequent time intervals equal to the integration time of the dye. The output signals propagate from substantially the same position on the organic dye so that an observer's eyes will superimpose those signals and perceive a complete image. The many individual output signals forming each complete image are generated at a sufficiently fast rate so that an observer will perceive successively provided complete output images as a real time view of a changing scene.

In the embodiment illustrated herein, simple interference patterns are formed by directing two beams of mutually coherent laser light to intersect and interfere with each other proximate an organic dye amplifier.

The organic dye has such a short integration time that the beams can be deflected by acousto-optic deflectors in order to provide different interference patterns. These deflectors steer the beams very rapidly so that it is possible to form the number of simple interference patterns required to produce successive holograms well within the integration time of an observer's eyes. However, acousto-optic deflectors shift the frequencies of the laser beams slightly as they deflect those beams. The interference fringes of a pattern formed by interfering beams are caused to move when the frequencies of the interfering beams are unequal. Apparatus must be provided to compensate for this movement in some systems in order to prevent degradation of the output image. However, no such compensating apparatus is required in the system of this invention because the integration time of the recording media, namely the organic dye is so short that the interference fringes are unable to move a sufficient distance during the time interval in which each one of the output signals is being formed to significantly degrade any output signal.

BRIEF DESCRIPTION OF THE DRAWING

Further objects, features and advantages of this invention, which is defined by the appended claims, will become apparent from a consideration of the following description and the accompanying drawing which is a schematic, plan, top view of one embodiment of the apparatus for this invention for synthesizing three-dimensional images.

DETAILED DESCRIPTION OF THE PREFERRED EMBODIMENT

FIG. 1 illustrates a device 10 for producing a sequence of three-dimensional output images. The device 10 includes apparatus 12 for rapidly providing sequences of simple interference patterns, apparatus 14 for providing a beam 16 of laser light, and an amplifying cell or amplifier 18 disposed to receive the interference patterns and the beam 16 and provide a sequence of output signals.

The apparatus 12 for providing simple interference patterns is very similar to apparatus described in the above-mentioned Application Ser. No. 116,983, and therefore, will be only very briefly described. The apparatus 12 includes a pulsed laser generator 20 for providing a thin beam 21 of laser light, an objective lens 22 for receiving and expanding the thin beam 21, and a collimating lens 24 for collimating the expanded beam 21. A beam splitter 26 is disposed to receive the expanded and collimated beam 21 and divide that beam into two beams 28 and 30. A second beam splitter 32 divides beam 28 into two beams 34 and 36. Beam 34 is directed to strike a diffuse or ground glass surface 38 which is disposed substantially parallel to radiation receiving surface 40 of amplifying cell 18. A lens 42 focuses beam 34 to strike a small point 44 on glass 38. Light propagates from this point in a cone-shaped distribution 46 to illuminate surface 40 of cell 18.

Beam 36 is directed by a mirror 48, and focused by a lens 50 to strike a point 52 on a ground or diffuse reflecting surface 54 which is disposed substantially perpendicular to surface 40 of cell 18. Light propagates from the point 52 in a cone-shaped distribution 56 which interferes with the cone of light 46 and creates an interference pattern proximate surface 40 of amplifying cell 18. Interfering light signals propagating from two points provide a simple or uncomplicated interference pattern. A series or sequence of simple interference patterns whose superposition comprises a complex holographic interference pattern is provided by deflecting beams 34 and 36 to move the positions of points 44 and 52 and thereby provide different interference patterns. In order to deflect beams 34 and 36, the apparatus 12 includes acousto-optic deflectors 58 and 60 which deflect beam 34 in the vertical and horizontal directions, respectively, and an acousto-optic deflector 62 for deflecting beam 36 to move point 52 toward and away from amplifying cell 18. The deflectors 58, 60, and 62 operate under the control of a programmed electronic control 64.

The apparatus 12 also includes a Pockel cell modulator 66 and an analyzer 68 for controlling the intensity of light signal 28. Each interference pattern projected onto amplifier 18 is provided with an intensity appropriate with the intensity of the component of the complete image represented by that interference pattern.

The apparatus 14 for projecting beam 16 of laser light to strike surface 40 of amplifier 18 includes a cylindrical lens 70 positioned to receive beam 30 and focus that beam to a line on an organic dye cell 72. Cell 72 comprises an organic dye such as rhodamine 6-G that receives the focused beam 30, and lases to provide a thin output beam 16 having a lower frequency and longer wavelength than beams 30, 34, and 36. Two mirrors 74 and 76 are disposed on opposite sides of dye cell 72 to repeatedly reflect signal 16 through dye cell 72 to cause the intensity of that signal to be increased by harmonic oscillation. Mirror 76 is only partially transparent, and therefore, reflects only a portion of signal 16. A portion of intensified signal 16 is transmitted through mirror 76 to be directed by a mirror 82 and dichroic beam splitter 84 to strike surface 40 of amplifying cell 18. The dichroic beam splitter 84 is transparent to light having a frequency equal to that of cones 46 and 56 and reflective to light having a frequency equal to that of beam 16. A lens 86 receives beam 16 upstream from amplifying cell 18 and expands that beam to illuminate the entire portion of amplifier 18 receiving interfering signals 46 and 56.

Amplifier 18 comprises a cell of organic dye material such as rhodamine 6-G. Organic dye absorbs energy from wave energy signals having a first frequency, and utilizes the absorbed eergy to amplify received wave energy having a different frequency. Amplifier 18 is adapted to absorb energy from cones 46 and 56. Amplifier 18 utilizes the absorbed energy to differentially amplify beam 16 to provide an amplified output signal. The pattern or cross-sectional intensity distribution of the amplified output signal corresponds to the intensity distribution of the energy absorbed by amplifier 18. Amplifier 18 retains energy absorbed from each one interference pattern and utilizes that energy to differentially amplify beam 16 only for a time interval equal to the integration time of the organic dye material. Organic dyes have extremely short integration times, generally less than $10^{-8}$ seconds. A series of interference patterns received over a time interval greater than the integration time of the dye thus provide a series of different output signals. A low-pass filter 88 is disposed downstream from amplifying cell 18 to transmit the series of output signals to an observer 90 and to remove any portions of light cones 46 and 56 that have not been absorbed by cell 18.

In operation, acousto-optic deflectors 58, 60, and 62 operating according to signals received from programmed electronic cotrol 64 deflect beams 34 and 36 to create a sequence of simple interderence patterns. The superposition of these simple interference patterns comprise a complete holographic interference pattern of a complete image. The precise manner in which the beams are to be deflected to produce a sequence of simple interference patterns whose superimposition comprises a desired hologram is described in detail in application Ser. No. 116,983. Organic dye amplifier 18 absorbs energy from the interfering signals 46 and 56. The energy absorbed by amplifier 18 from each portion of the interference pattern projected onto that amplifying cell remains localized. The absorbed energy differentially amplifies beam 16 to provide an amplified output signal. The amplitude distribution of the output signal is determined by the pattern or intensity distribution of the absorbed energy stored in the organic dye material of amplifying cell 16. At any one instant, beam 16 is modulated only by those interference patterns received by amplifying cell 18 within a time interval equal to the integration time of the organic dye. The integration time interval of the organic dye material is so short that the cell receives only one of the very large number of simple interference patterns required to form a hologram. Therefore, between 1,000 and 10,000 different output signals are generally required to provide one complete output image. The precise number of output signals required is determined by the complexity of the image. Thus, instead of providing a single output signal comprising a complete image, the organic dye amplifier 18 provides a sequence of output signals. The superposition of this sequence of output signals comprises a complete image. The device 10 provides subsequent output signals at such a fast rate that successive complete three-dimensional images are provided within the 1/30th of a second integration time of an observer's eyes. An observer thus perceives the sequence of signals required to form one complete three-dimensional image as a complete image, and perceives a sequence of different complete three-dimensional images as a real time view of a changing scene. The device 10 may thus be used to synthetically generate either a complete three-dimensional image or a real time view of a changing scene though no complete hologram is ever stored in the amplifying cell 18.

Having thus described one embodiment of this invention, a number of modifications will readily occur to those skilled in the art. For example, the device 10 includes lenses 34 and 50 for focusing beams 34 and 36 to very sharp or precise points 44 and 52, respectively, in order to create a very distinct interference pattern. Acceptable interference patterns may also be produced by an embodiment employing thin laser beams and not requiring focusing lenses such as lenses 34 and 50. In addition, other recording media having very short integration times may be used in place of the organic dye cell 18 of the device 10.

Therefore, what is claimed is:

1. A device for synthesizing a three-dimensional image of a scene comprising:

signal generating means for generating a large number of simple interference signals at a sufficiently fast rate to provide a sequence of signals representing a hologram within a time interval equal to the integration time of an observer's eyes, each simple interference signal representing the interference of wave energy from two point sources;

means for providing a beam of laser light; and an amplifying dye cell medium positioned to receive said interference signals and said beam of laser light for absorbing energy from said interference signals and utilizing the absorbed energy to differentially amplify said beam of laser light in accordance with the intensity distribution of the absorbed energy, said medium having a short integration time causing the medium to retain each interference pattern only for a time substantially shorter than the time required to provide a sufficient number of simple interference patterns to form a hologram and thereby provide a large number of output signals in sequence to be integrated by the observer's eyes into a complete three-dimensional image.

2. The device of claim 1 wherein:

said interference signals comprise wave energy signals having a frequency different from the frequency of said beam of laser light.

3. The device of claim 2 wherein said signal generating means directs each of said interference signals to strike substantially the same position on said medium to thereby cause said output signals to propagate from substantially the same position and be superposed on each other.

4. The device of claim 3 wherein:

said medium comprises an organic dye material having a predetermined integration time for absorbing energy from said interference signals and utilizing said absorbed energy to differentially amplify said beam of laser light to provide said output signals;

said organic dye material utilizes energy absorbed only from interference signals received within a time interval equal to said integration time to provide an output signal, signals received in subsequent time intervals equal to said integration time of said organic dye material being used to provide subsequent output signals; and said integration time of said organic dye material is sufficiently short so that only a small number of the simple interference patterns required to form a holographic interference pattern are used to provide each one output signal.

5. The device of claim 4 wherein:

said signal generating means comprise:

means for directing two beams of mutually coherent wave energy to intersect and interfere with each other proximate said medium, said two beams having frequencies slightly different from the frequency of said beam of laser light; and means for rapidly deflecting at least one of said interfering beams in order to produce many different interference patterns;

said deflecting means also shifts the frequency of at least one of said interfering beams by a small amount, said frequency shift causing the interference fringes of the pattern produced by said interfering beams to move, said fringe movement degrading the interference pattern; and said integration time of said organic dye material is sufficiently short so that said interference fringes are unable to move a sufficient distance during the time interval in which each one input signal is being formed to significantly degrade any output signal.

6. The device of claim 5 wherein said deflecting means provides a frequency shift on the order of 200 MHz.

7. The device of claim 5 wherein:

said deflecting means produce at least 1,000 different interference patterns within approximately one-thirthieth of a second, said at least 1,000 patterns being required to form a hologram; and said organic dye material has an integration time less than approximately $10^{-8}$ seconds.

8. The device of claim 7 in which said signal generating means is adapted to provide subsequent sequences of different interference patterns to thereby provide a sequence of different images, an observer perceiving said sequence of images as a real time view of a changing scene.

* * * * *